UNITED STATES PATENT OFFICE.

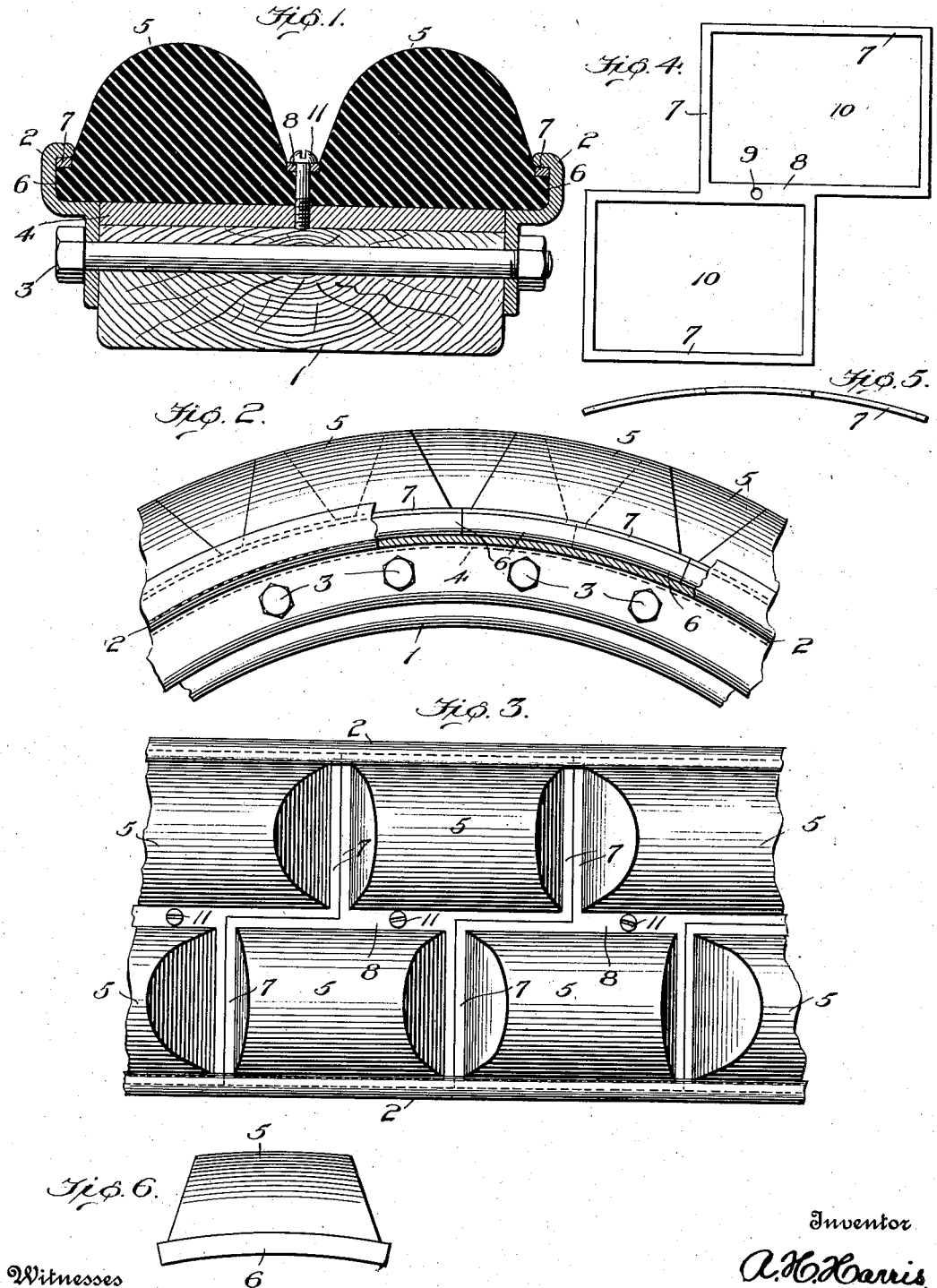

ARCHER H. HARRIS, OF YOUNGSTOWN, OHIO.

VEHICLE-WHEEL.

1,049,579. Specification of Letters Patent. Patented Jan. 7, 1913.

Application filed December 3, 1910. Serial No. 595,442.

*To all whom it may concern:*

Be it known that I, ARCHER H. HARRIS, a citizen of the United States, residing at Youngstown, in the county of Mahoning and State of Ohio, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels, but more particularly to truck wheels having resilient or cushion tires made up of independent elastic sections or blocks, and to means for securely retaining such blocks in operative position.

It has for its object to provide vehicles, especially trucks and wagons for heavy hauling, with wheels and tires of unusual strength and durability, tires made up of independent sections conveniently applied to or removed from a wheel rim as occasion may demand or suggest; tires formed of independent sections or blocks as aforesaid, arranged and adapted to prevent skidding; and tires including fastening or attaching means which effectually prevents creeping of the tire upon its supporting wheel-rim.

With these and other objects and advantages in view the present invention comprises certain structural features, the arrangement and combination thereof, as hereinafter particularly described and pointed out in the claims following.

In the accompanying drawings which form part of this application and whereon like numerals indicate corresponding parts in the several views: Figure 1 represents a transverse sectional view of the invention taken through a wheel felly, flanges, two individual tire sections or blocks, and one compound metallic attaching or retaining frame. Fig. 2 is a fragmentary view of the invention in side elevation, with one wheel-flange broken away exposing to view the base of said individual tire blocks or sections. Fig. 3 is a plan view of parts shown by Figs. 1 and 2. Fig. 4 is also a plan view showing one of the attaching and interlocking frames detached. Fig. 5 is a side elevation of the detached frame shown by Fig. 4. Fig. 6 is a side elevation of one tire block removed.

Reference being had to the drawings and numerals thereon, 1 indicates a felly, 2, 2 removable side flanges, 3 transverse bolts for securing said flanges to the felly 1 of a wheel, and 4 an endless metallic rim encircling felly 1 at its periphery, all of well known construction and arrangement.

The numeral 5 indicates individual elastic tire sections or blocks each having an integral surrounding base-flange 6 and resting firmly upon the felly-encircling band 4, as shown by Figs. 1 and 2, but in staggered relation as best shown by Fig. 3. Over each pair of tire-blocks 5 is placed an attaching and interlocking frame 7 of relatively stiff sheet metal, or of any suitable material, curved as shown by Fig. 5 in conformity with the radius of the wheel and comprising two rectangular compartments of increased width at their juncture as shown at 8, and there perforated by a bolt or screw hole 9 preferably about the center of said connecting web 8. This double skeleton frame 7 is so positioned in practice that its individual compartments 10 completely surround their respective tire blocks 5 resting upon the outer surface of the block flanges or enlarged bases 6 and extend collectively from side to side of the structure where they interlock beneath the clenching in-turned edges of wheel flanges 2, 2 as best shown by Fig. 1. While at an intermediate point each of said double and interlocking frames is firmly secured against the possibility of slipping, circumferentially or otherwise, by agency of machine screws 11 passing loosely through screw holes 9 in web 8, thence between the abutting portions of tire sections or blocks 5, and finally into the endless band 4 which encircles felly 1.

The foregoing being a description of my invention in its best form of construction at present known to me, it should be understood that the invention is broad enough to include any form and arrangement of attaching and interlocking frame such as 7 operating substantially as hereinbefore described, provided the individual openings or compartments 10 of such frame embrace and interlock with a plurality of individual tire sections or blocks in circumferential series, but in any event it is desirable in dual or multiple tires to stagger the blocks 5 transversely across the wheel rim in brick-wise arrangement as shown, or, in other words, to break joints for the well understood purpose of avoiding unnecessary vibrations at the point of contact with a road bed, to prevent skidding, and to insure superior traction. Moreover, it will be particularly noted that owing to the form, structural arrangement, and relative position of the parts hereinbefore described, all shocks or strains imparted to any one block 5 at its point of contact with the ground, or with any unusual object, is resisted not only by the block in direct contact but by that block or those blocks with which it is interlocked by agency of the frames 7 and their attaching screws 11. Thus two or more tire sections or blocks are interlocked by means of their particular attaching frame 7, and the latter in turn is interlocked at its opposite sides by flanges 2, 2 of the wheel rims when properly drawn up by bolts 3 as parts are assembled in operative relation.

Having thus described my invention, what I claim and desire to secure by Letters Patent is:

1. In a vehicle wheel the combination with a circumferential series of skeleton frames crossing the wheel tread diagonally and having independent compartments offset with relation to each other, of a multiplicity of individual tire blocks in brickwise arrangement projecting outward through said compartments each block having an enlarged base coinciding with the margins of said frames by which they are bound down, and means for securing said frames to the wheel.

2. In a vehicle wheel the combination with a circumferential series of skeleton frames crossing the wheel tread diagonally and having independent compartments offset with relation to each other, of a multiplicity of individual tire blocks in brickwise arrangement projecting outward through said compartments each block having an enlarged base coinciding with the margins of said frames by which they are bound down, and screws intermediate of the adjacent compartments of each of said frames for securing them to the wheel.

In testimony whereof I affix my signature, in presence of two subscribing witnesses.

ARCHER H. HARRIS.

Witnesses:
JOHN A. MORNEWECK,
T. MATCHETT.